(12) United States Patent
Delmerico et al.

(10) Patent No.: US 8,344,550 B2
(45) Date of Patent: Jan. 1, 2013

(54) POWER CONVERSION CONTROL WITH ENERGY STORAGE

(75) Inventors: Robert William Delmerico, Clifton Park, NY (US); Xiaoming Yuan, Hubei (CN)

(73) Assignee: General Electric Company, Niskayuna, NY (US)

( * ) Notice: Subject to any disclaimer, the term of this patent is extended or adjusted under 35 U.S.C. 154(b) by 111 days.

(21) Appl. No.: 12/974,104

(22) Filed: Dec. 21, 2010

(65) Prior Publication Data

US 2011/0222320 A1    Sep. 15, 2011

(51) Int. Cl.
    H02M 5/45    (2006.01)
(52) U.S. Cl. .......................... 307/82; 320/123
(58) Field of Classification Search ............ 307/82; 320/123
    See application file for complete search history.

(56) References Cited

U.S. PATENT DOCUMENTS

| 2003/0151259 | A1 | 8/2003 | Feddersen et al. |
| 2007/0246943 | A1* | 10/2007 | Chang et al. ............... 290/44 |
| 2009/0015202 | A1* | 1/2009 | Miura ........................ 320/132 |
| 2009/0194995 | A1 | 8/2009 | Delmerico et al. |
| 2009/0230689 | A1 | 9/2009 | Burra et al. |
| 2009/0278354 | A1 | 11/2009 | Ichinose et al. |
| 2010/0008119 | A1 | 1/2010 | O'Brien et al. |

FOREIGN PATENT DOCUMENTS

GB    2023237    12/1979

OTHER PUBLICATIONS

The 7th International Conference on Power Electronics, Oct. 22-26, 2007/EXCO, Daegu, Korea. Power Control of a Grid-Connected Hybrid Generation System with Photovoltaic/Wind Turbine/Battery Sources. Jinhong Jeon et al. pp. 506-510. Copyright 2008, IEEE.*
IEEE Transactions on Industrial Electronics, vol. 55, No. 4, Apr. 2008. Dynamic Modeling and Control of a Grid-Connected Hybrid Generation System with Versatile Power Transfer. Seul-Ki Kim et al. pp. 1677-1688. Copyright 2008 IEEE.*
Proceedings of the 2007 IEEE International Conference on Mechatronics and Automation. Aug. 5-8, 2007, Harbin, China. Twi-Sliding Mode Control for Efficiency Improvement in Variable Speed Small Wind Turbine Systems. Guoliang Yang et al. pp. 3717-3723. Copyright 2007 IEEE.*
Modeling and Control of an Integrated Wind Power Generation and Energy Storage System. Zhenhua Jiang et al. Copyright 2009 IEEE.*
2008 Australasian Universities Power Engineering Conference (AUPEC '08). Control of Energy Storage Interface with a Bidirectional Converter for Photovoltaic Systems. Hasan et al.*
R. K. Burra et al., "Multi-Use Energy Storage for Renewable Sources," U.S. Appl. No. 12/566,739, filed Sep. 25, 2009.

(Continued)

Primary Examiner — Fritz M Fleming
(74) Attorney, Agent, or Firm — Ann M. Agosti

(57) ABSTRACT

A power generation system includes a renewable power source for producing source power; a source side converter for converting the source power to converted DC power; a source side controller for driving the converted DC power towards a maximum power point; a DC link for receiving the converted DC power; a grid side converter coupled to the DC link for converting DC link power from the DC link to AC output power for a grid; a grid side controller for controlling the AC output power of the grid side converter to achieve grid interconnection requirements; an electrical energy storage device; an energy storage converter coupling the energy storage device to the DC link; an energy storage controller for controlling the energy storage converter to achieve a desired power balance on the DC link.

14 Claims, 4 Drawing Sheets

OTHER PUBLICATIONS

D.L. Manz et al., "System and Method for Providing Power Grid Energy From a Battery," U.S. Appl. No. 12/645,843, filed Dec. 23, 2009.

R.W. Delmerico et al., "Power Conversion System and Method for Rotary Power Generation System," U.S. Appl. No. 12/820,354, filed Jun. 22, 2010.

* cited by examiner

POWER CONVERSION CONTROL WITH ENERGY STORAGE

BACKGROUND

The subject matter disclosed herein relates generally to power conversion systems and more specifically to use of energy storage in conjunction with power conversion systems of renewable energy sources.

In conventional control approaches for renewable energy sources with dual stage power conversion, a source side converter is coupled in parallel by DC (direct current) link to a grid side converter. In a wind turbine embodiment, for example, a source side controller uses wind turbine generator torque regulation to control the source side converter, and a grid side controller uses DC voltage regulation to control the grid side converter. Other examples of renewable energy sources include solar and marine hydrokinetic energy sources.

A goal of the source side controller when providing power from a renewable energy source is to transmit as much of the source power to the grid as possible, whereas a goal of the grid side converter is to satisfy grid interconnection requirements that affect power output such as ramp rate limits, governor droop control, curtailment, and fault ride through. These different control objectives for source and grid side control sometimes result in a power imbalance on the DC link that causes charging or discharging of the DC link capacitor resulting in undesirable voltage fluctuations.

BRIEF DESCRIPTION

It would be desirable to have an improved power conversion control embodiment for balancing the voltage on the DC link while allowing the source and grid side controllers to be less constrained by the voltage on the DC link.

In accordance with one embodiment disclosed herein, a power generation system comprises: a renewable power source for producing source power; a source side converter for converting the source power to converted DC power; a source side controller for driving the converted DC power towards a maximum power point; a DC link for receiving the converted DC power; a grid side converter coupled to the DC link for converting DC link power from the DC link to AC output power for a grid; a grid side controller for controlling the AC output power of the grid side converter to achieve grid interconnection requirements; an electrical energy storage device; an energy storage converter coupling the energy storage device to the DC link; and an energy storage controller for controlling the energy storage converter to achieve a desired power balance on the DC link.

In accordance with another embodiment disclosed herein, a control system is provided for a renewable power generation system. The renewable power generation system comprises a renewable power source for producing source power, a source side converter for converting the source power to converted DC power, a DC link for receiving the converted DC power, a grid side converter coupled to the DC link for converting DC link power from the DC link to AC output power for a grid, an electrical energy storage device having a state of charge (SOC), and an energy storage converter coupling the energy storage device to the DC link. The control system comprises: a source side controller for driving the converted DC power towards a maximum power point; a grid side controller for controlling the AC output power of the grid side converter to achieve grid interconnection requirements; an energy storage controller for controlling the energy storage converter to achieve a desired power balance on the DC link; and a state of charge (SOC) manager for receiving a SOC signal from the energy storage device and, when the SOC signal is outside an acceptable SOC operating range, providing one or more SOC adjustment signals to the grid side controller, the source side controller, or both the grid and source side controllers.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
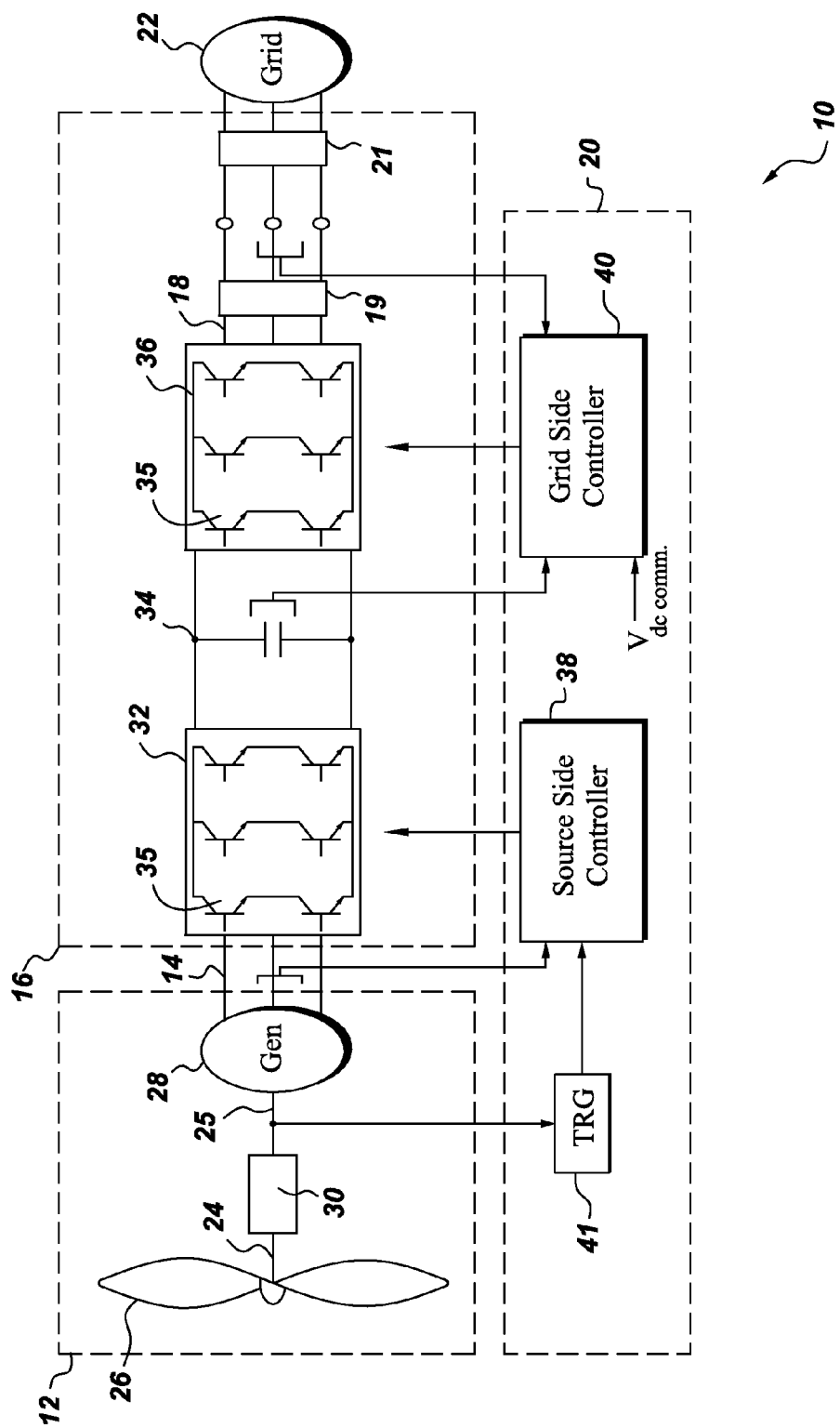
FIG. 1 is a block diagram of a conventional wind power generation system.

Reference is first made to a conventional renewable power generation system 10 as illustrated in FIG. 1. System 10 comprises a wind turbine generator 12 for generating an alternating current on phase conductors 14 with a variable frequency, a power conversion module 16 for converting the alternating current on phase conductors 14 into an alternating current on phase conductors 18, and a conventional power conversion control system 20 for receiving reference signals and commands for generating control signals for controlling operation of power conversion module 16. Alternating current on phase conductors 18 is further fed to an electric grid 22 with components such as filters 19 and transformers 21 typically being present along phase conductors 18. Although FIG. 1 illustrates a wind power generation system for purposes of example, embodiments of the invention are applicable to any renewable energy source with several other examples including solar and marine hydrokinetic energy sources.

Turbine 12 comprises a plurality of turbine blades 26 and a generator 28 including a generator rotor (not shown) and a generator stator (not shown). Turbine blades 26 are coupled to a first rotatable shaft 24 which in some embodiments is mechanically coupled to a gearbox 30. Gearbox 30 is further coupled to the generator rotor through a second rotatable shaft 25 to drive the generator rotor to rotate. Rotation of the generator rotor induces the alternating current on phase conductors 14 from windings on the generator stator.

As is illustrated, power conversion module 16 comprises a source side converter 32, a DC link 34, and a grid side converter 36. Source side and grid side converters 32 and 36 each include a plurality of semiconductor switches 35, such as IGBTs (insulated gate bipolar transistors), IGCTs (insulated gate commutated thyristors), and MOSFETs (metal oxide semiconductor field effect transistors). Source side converter 32 receives variable-frequency alternating current on phase conductors 14 from generator 28 and converts alternating current on phase conductors 14 into a DC current at DC link 34. Grid side converter 36 receives the DC current at DC link 34 and converts the DC current into an alternating current with controlled magnitude and/or frequency for feeding electric grid 22.

The illustrated conventional power conversion control system 20 includes a source side controller 38 and a grid side controller 40. Source side and grid side controllers 38 and 40 respectively receive a number of reference signals and commands and respectively generate pulse width modulation (PWM) control signals for the source side and grid side converters 32 and 36. As is illustrated, the conventional power conversion control system 20 uses a torque reference generator (TRG) device 41 to direct the maximum power point trajectory of the turbine and generate a torque command signal. Source side controller 38 receives the torque command signal and uses an interrelationship between the torque command signal and alternating current on phase conductors 14 (such as a measured three-phase current and voltage signals) to generate a PWM control signal for controlling switching operations of semiconductor switches 35 of source side converter 32. In one embodiment, source side controller 38 uses the alternating current on phase conductors 14 to generate a torque feedback signal and then uses the torque command switches to control the generator torque. In certain embodiments, the torque feedback signal can be obtained by searching in a look-up table, by observing measured results, or by observing a correlation function of generator torque and the alternating current.

Grid side converter 40 receives a DC link voltage command signal $V_{dc\_comm}$, and a measured DC voltage feedback signal of DC link 34 and uses these signals along with other signals such as measured feedback signals from phase conductors 18 to control switching operations of semiconductor switches 35 of grid side converter 36 and maintain the DC link voltage at a desired level.

Using such a conventional power conversion control system 20, performance of the grid side converter 36, to maintain DC link voltage, may be compromised by an ill behaved grid. For example, if grid 22 is very weak or has an electrical resonance due to shunt or series connected capacitance, the grid side converter DC link voltage control may become unstable.

Figure 2:
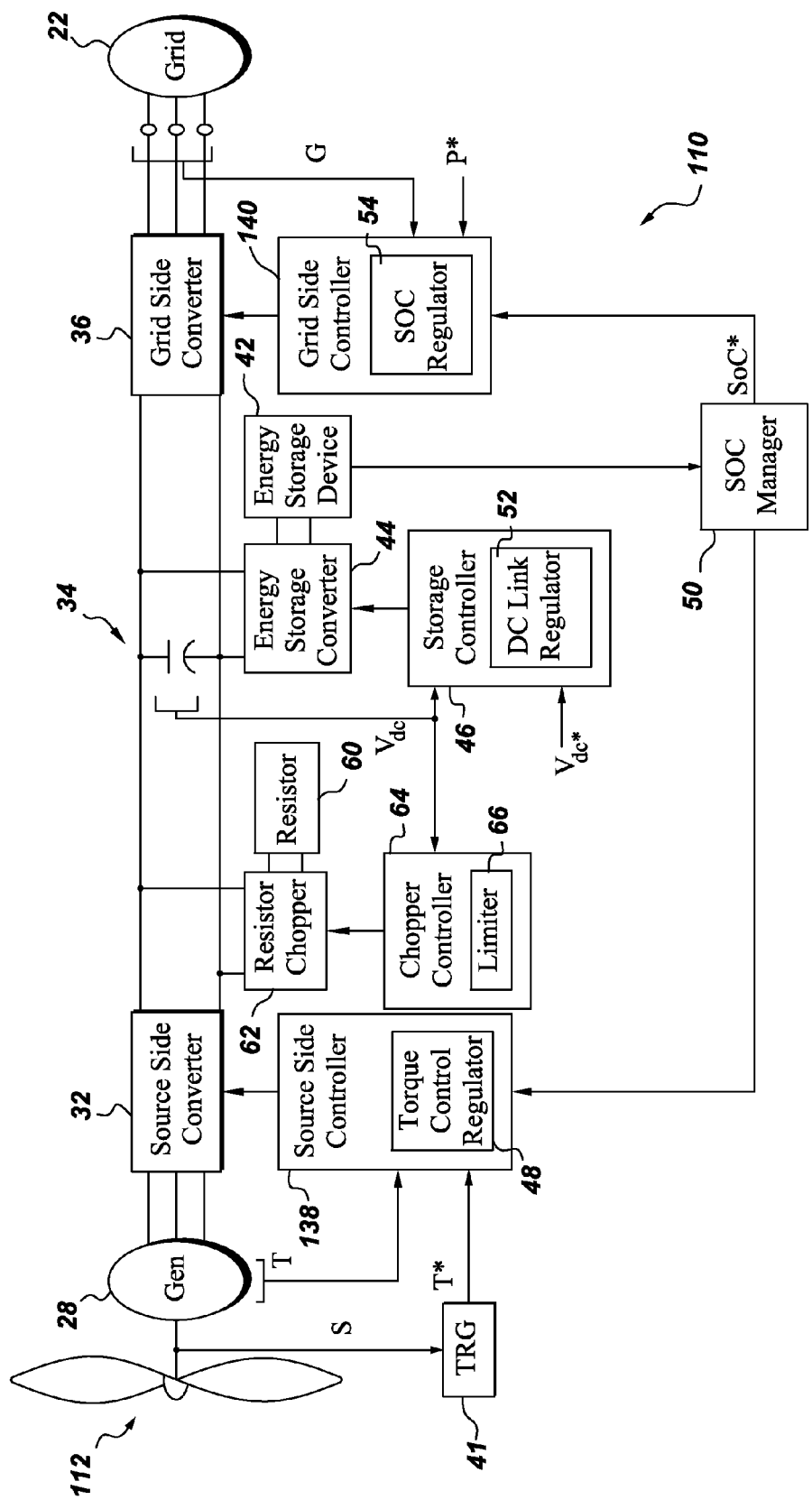
FIG. 2 is a block diagram of a wind power generation system in accordance with one embodiment of the present invention.

FIG. 2 is a block diagram of a power generation system 110 in accordance with one embodiment of the present invention. In the embodiment of FIG. 2, power generation system 110 comprises: a renewable power source 112 for producing source power (illustrated as a wind turbine for purposes of example); a source side converter 32 for converting the source power to converted DC power; a source side controller 138 for driving the converted DC power towards a maximum power point (and thus providing as much power as reasonably available from the renewable power source in the absence of contrary system requirements, as discussed below); a DC link 34 for receiving the converted DC power; a grid side converter 36 coupled to DC link 34 for converting DC link power from DC link 34 to AC output power for a grid 22; a grid side controller 140 for controlling the AC output power of grid side converter 36 to achieve grid interconnection requirements; an electrical energy storage device 42; an energy storage converter 44 coupling energy storage device 42 to DC link 34; and an energy storage controller 46 for controlling energy storage converter 44 to achieve a desired power balance on the DC link. The power balance may be achieved, in one embodiment, by power exchange between DC Link 34 and energy storage device 42. Source and grid side controllers 138 and 140 may each operate to meet independent control objectives while a SOC of energy storage device 42 is within an acceptable SOC operating range.

Non-limiting examples of types of electrical energy storage devices 42 include devices such as batteries, super capacitors, flywheels, and magnetic energy storage systems. Non-limiting examples of renewable power sources 112 include sources such as wind turbines, photovoltaic modules, and marine hydrokinetic energy devices. The type of converter appropriate for source side converter 32 will depend somewhat upon the specific power source, with wind turbines and marine hydrokinetic energy devices tending to use AC to DC converters and photovoltaic power sources tending to use DC to DC converters. Grid side converter 36 will typically but not necessarily comprise a DC to AC inverter. The source and grid side converters 32 and 36 may comprise single phase or multi-phase configurations and may comprise single levels or multiple-levels. Grid 22 is meant to include any interconnected network for delivering electricity from power sources to utility distribution systems and/or loads.

The various control elements are shown as discrete blocks for ease of illustration. Although the source side controller 138, the energy storage controller 46, and the grid side controller 140 are illustrated as discrete control units, in another embodiment all or some of the source side controller 138, the energy storage controller 46, and the grid side controller 140 may be integrated into a common control unit. Additionally, although not shown, a supervisory (plant level) type controller will typically be employed to provide control signals such as those associated with or in response to grid requirements to individual renewable power sources and to receive signals from the individual renewable power sources for supervisory level control calculations.

In one embodiment wherein renewable power source 112 comprises a rotary generator (such as in wind and marine hydro turbine configurations), source side controller 138 is configured for receiving a torque feedback signal T from generator 28 and a torque command signal T* from torque reference generator 41 for use in providing the source switching signals to source side converter 32, and grid side controller 140 is configured for receiving grid feedback signals G and a reference command (such as for example a power command P*) from grid 22 or the supervisory controller of the operating plant (not shown) for use in providing grid switching signals to grid side converter 36. Torque reference generator 41 in one embodiment receives a generator speed signal S and uses that speed signal to generate the torque command by using a maximum power tracking algorithm which is then used by the source side controller for controlling operation of the source side converter to drive the output power of the source side convert towards the maximum power point. Source side controller 138 may include a torque control regulator 48 to evaluate any difference between the torque feedback and command signals and adjust the source switching signals to control the current from the source side converter so as to drive the difference between the torque feedback and command signals towards zero and extract the needed torque. Although not shown, other regulator loops such as inner current and generator flux regulator loops will also typically be present. Although torque is shown in FIG. 2 and described as one example of a source side reference value, other types of source side reference values may be used if desired with several examples including power and active current. Grid side controller additionally typically comprises a number of regulator loops (not shown) such as inner power, inner current, voltage, and VAR regulator loops.

Because energy storage controller 46 provides storage switching signals to energy storage converter 44 for achieving a desired power balance on DC link 34, as long as there is sufficient state of charge (SOC) in energy storage device 42, this control function of energy storage controller 46 allows source and grid side controllers 138 and 140 to each operate independently in achieving specific goals and does not require either to assist in achieving that desired power balance on DC link 34 and maintaining the DC link voltage at a nominal value. The control of energy storage device 42 as the primary DC link voltage regulator results in decoupling of the generator torque from the grid side output power over a wide dynamic range. With such decoupling, the generator torque is able to be controlled independently of the grid side power and thus the source converter may be controlled a in a manner to provide desirable power extraction from wind while enabling long mechanical life, and the grid converter may be controlled to provide grid-friendly features such as inertia, ramp rate control, fault ride through, and power system stabilization. Another benefit of having DC link 34 supported by energy storage is that less support is required from grid 22 and thus not as strong of a grid connection is needed in comparison to more conventional control embodiments.

In one embodiment for achieving the desired power balance on the DC link, energy storage controller 46 is configured for receiving a DC link voltage feedback signal Vdc and a DC link voltage reference signal Vdc*. A DC link regulator 52 compares the DC link voltage feedback and reference signals and provides command signals for switching of energy storage converter 44 in a manner to extract power from (or in some cases divert power to) energy storage device 42 so as to drive the DC link voltage feedback signal toward the DC link voltage reference signal. The DC link voltage reference signal may comprise a constant value or a value that is varied based on operating conditions to reduce losses in power generation system 110 and may be generated by the grid side controller or the source side controller, for example.

In another embodiment for achieving the desired power balance on the DC link 34, energy storage controller 46 is configured for receiving a signal representative of source side power and a signal representative of grid side power and for generating storage switching signals so as to balance the source side power, the grid side power, and power supplied by energy storage device 42. This embodiment will have the affect of managing the DC link voltage without a direct comparison of DC link voltage feedback and reference signals.

Both power balancing embodiments are useful for allowing independent operation of source and grid side converters 32 and 36 when the SOC of energy storage device 42 is within an acceptable range. However, independent operation is more of a challenge when the SOC is outside the acceptable range. In one embodiment, a SOC manager 50 receives a SOC signal from energy storage device 42 and, when the SOC signal is outside the acceptable SOC operating range, provides one or more SOC adjustment signals to grid side controller 140, source side controller 138, or both the grid and source side controllers. The technique for measuring SOC will depend on the type of energy storage device that is used. For example, if the energy storage device 42 comprises a battery, SOC may be measured by monitoring the net energy exchange and voltage on the battery.

In either type of grid or source side control adjustment, the original reference command (such as in the wind turbine example above the power command for the grid side or the torque command for the source side) is adjusted in light of the adjustment signal from the SOC manager. In one example, the adjustment is done through a summation element. As a practical matter, grid side adjustments tend to be less complex than source side adjustments.

When making grid side adjustments, if the SOC is too low, an SOC regulator 54 may be configured to generate signals to reduce the output power from grid side converter 36 so that some energy that would have gone to grid 22 can be absorbed in energy storage device 42; or, if the SOC too high, SOC regulator 54 may be configured to send grid control signals to increase the output power to grid 22 or to a switch diverting power to a dynamic braking resistor 60 and thus bleed off excess charge from energy storage device 42. In one embodiment, dynamic braking resistor 60 is coupled to DC link 34 via a resistor chopper 62, and brake control signals (not shown) from SOC regulator 54 are sent to a chopper controller 64 for controlling operation of resistor chopper 62. Chopper controller 64 may include a DC link resistor voltage limiter 66. In one embodiment, DC link voltage feedback signal Vdc may be used by limiter 66 for generating control signals to provide resistor control signals (in addition to or in place of the control signals originating from the SOC regulator) for overvoltage limit protection.

When making source side adjustments, if the SOC is too low, in some embodiments, source side controller 138 may be configured to generate source signals to increase source side power to put more power on DC link 34 for energy storage device 42 to absorb; or, if the SOC is too high, source command signals may be calculated to reduce the power from renewable power source 112. However, in some embodiments, constraints may exist for such adjustments. For example, if the source side is already operating to provide a maximum amount of power, additional power may not necessarily be available. As another example if a power reduction is required, when renewable energy source 112 comprises a wind turbine, torque adjustments may need to involve mechanical adjustments such as blade pitching in addition to changes in the source side converter control. In one embodiment, driving the converted DC power from source side converter 32 at a maximum power point means operating the source side at maximum power unless some constraint (such as a grid command or the SOC being too high) results in a command for power reduction from the a source side. If desired, a resistor 60 may also or alternatively be used to decrease SOC and prevent Vdc overvoltage as discussed above.

Figure 3:
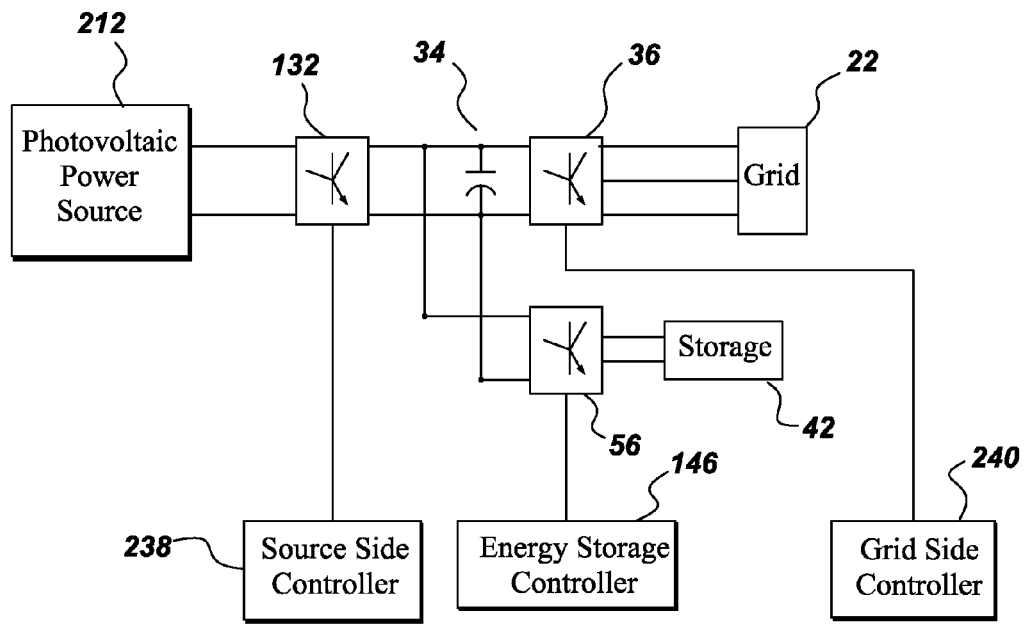
FIG. 3 is a block diagram of a solar power generation system in accordance with one embodiment of the present invention.

FIG. 3 is a block diagram of a solar power generation system 210 in accordance with one embodiment of the present invention. In this embodiment, the renewable power source 212 comprises a photovoltaic module or array, and source side converter 132 comprises a DC to DC converter. In one embodiment, energy storage device 42 is coupled to DC link 34 via a bidirectional energy storage DC to DC converter 56 in a similar manner as described in commonly assigned US20100008119, but the control scheme is different in that the DC link parameters are controlled primarily by the energy storage converter in the embodiment of FIG. 3. Energy storage controller 146 and grid side controller 240 may be operated in a similar manner as discussed with respect to FIG. 2. Source side controller 238 operation will be slightly different in that torque adjustment is not an option for photovoltaic power sources but similar in that switching of switches of source side converter 132 may still be adjusted to control the output parameters from source side converter 132. Several non-limiting examples of signals that may be used as source side parameters in this embodiment include power, current, and voltage.

Figure 4:
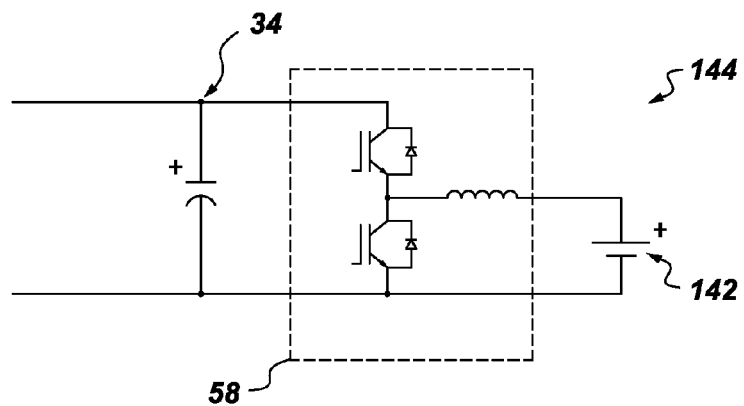
FIG. 4 is a block diagram of an example energy storage converter for use in the embodiments of FIGS. 2 and 3.

FIG. 4 is a block diagram of an example energy storage converter 144 for use in the embodiments of FIGS. 2 and 3. In the example of FIG. 4 a two quadrant bidirectional chopper 58 is used to couple an energy storage device comprising a battery 142 to DC link 34. This embodiment is for purposes of example, and any bidirectional converter is expected to be useful. In an alternative embodiment, a unidirectional converter may be used to transfer power from battery 142 to DC link 34; however, such an embodiment would require another source of power to recharge battery 142.

Figure 5:
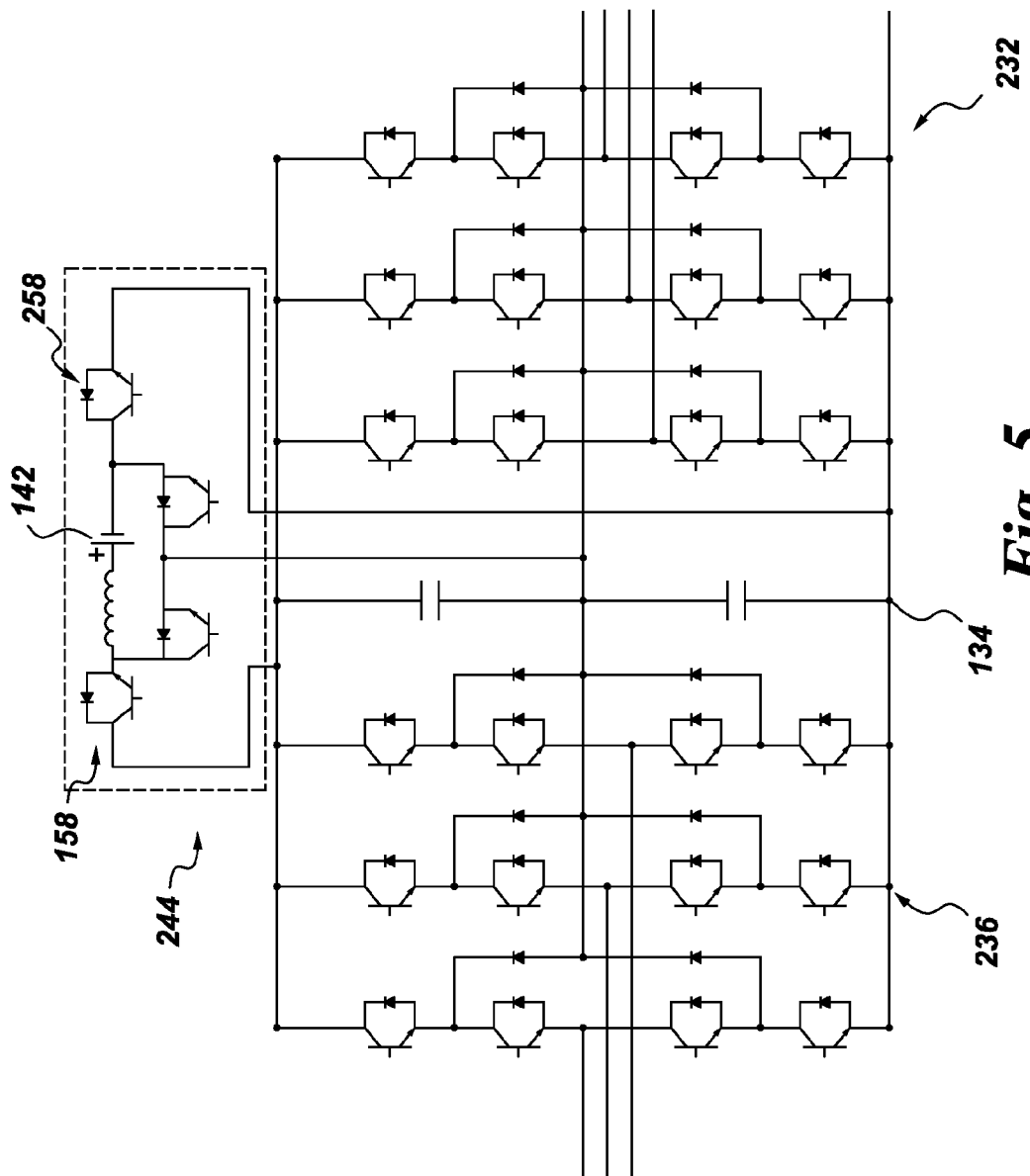
FIG. 5 is a block diagram illustrating another energy storage converter embodiment.

FIG. 5 is a block diagram illustrating another energy storage converter 244 for use with a three level converter embodiment. In this embodiment DC link 134 comprises a split DC link coupling source side converter 232 and grid side converter 236, and energy storage converter 244 comprises two bidirectional choppers 158, 258 coupled to battery 142 for independently interfacing with both halves of DC link 134. In this embodiment, the energy storage controller 244 may be controlled so as to help balance the split DC link. Additional levels of converter topologies are also possible to implement using similar principles.

Although the figures show one source side converter coupled to one DC link for purposes of example, in some embodiments (not shown), a plurality of source side converters may be coupled to a common DC link. In some embodiments, it may be useful to additionally use the energy storage device as a back up power device to provide emergency power to other loads that may be coupled to the DC link such as wind turbine auxiliary loads. In still other embodiments where more flexibility is desired and the energy storage device is of sufficient size, it may be useful to additionally use the energy storage device to enable power output from the grid side converter under conditions wherein little or no power is being supplied by the renewable power source. Examples of such conditions include lack of wind for a wind turbine and lack of sunlight for a photovoltaic system. In such embodiments, the source side converter may be disconnected, and the power may be supplied by the energy storage device to the grid through the grid side converter.

Unless defined otherwise, technical and scientific terms used herein have the same meaning as is commonly understood by one of skill in the art to which this invention belongs. The terms "a" and "an" do not denote a limitation of quantity, but rather denote the presence of at least one of the referenced item.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generation system comprising:
   a renewable power source for producing source power;
   a source side converter for converting the source power to converted DC power;
   a source side controller for driving the converted DC power towards a maximum power point;
   a DC link for receiving the converted DC power;
   a grid side converter coupled to the DC link for converting DC link power from the DC link to AC output power for a grid;
   a grid side controller for controlling the AC output power of the grid side converter to achieve grid interconnection requirements;
   an electrical energy storage device;
   an energy storage converter coupling the energy storage device to the DC link;
   an energy storage controller for controlling the energy storage converter to achieve a desired power balance on the DC link,
   a state of charge (SOC) manager for receiving a SOC signal from the energy storage device and, if the SOC signal is lower than an acceptable SOC operating range, for enabling charging of the energy storage device by providing a grid side low SOC adjustment signal to the grid side controller to reduce the AC output power and/or providing a source side low SOC adjustment signal to the source side controller to increase the source power, and, if the SOC signal is higher than the acceptable SOC operating range, for enabling discharging of the energy storage device by providing a grid side high SOC adjustment signal to the grid side controller to increase the AC output power, by diverting power from the DC link to a braking resistor, and/or by providing a source side low SOC adjustment signal to the source side controller to reduce the source power,
   wherein the source and grid side controllers each operate independently when the SOC of the energy storage device is within the acceptable SOC operating range.

2. The system of claim 1 wherein the energy storage controller is configured for receiving a DC link voltage feedback signal for use in controlling the energy storage converter.

3. The system of claim 2 wherein the energy storage controller is configured to compare the DC link voltage feedback signal to a DC link voltage reference signal.

4. The system of claim 1 wherein the energy storage controller is configured for receiving a signal representative of source side power and a signal representative of grid side power and for controlling the energy storage converter so as to balance the source side power, the grid side power, and power supplied by the energy storage device.

5. The system of claim 1 wherein the source side controller, the energy storage controller, and the grid side controller are situated in discrete control units.

6. The system of claim 1 wherein the source side controller, the energy storage controller, and the grid side controller are integrated into a common control unit.

7. The system of claim 1 wherein the source side controller is configured for receiving a torque feedback signal and a torque command signal for use in controlling the source side converter; and wherein the grid side controller is configured for receiving grid feedback signals and a power command for use in controlling the grid side converter.

8. The system of claim 1 wherein the renewable power source comprises at least one of a wind, solar, or marine hydrokinetic energy power source.

9. The system of claim 1 further comprising a DC link resistor and wherein a chopper controller, the energy storage controller, or a combination of the chopper and energy storage controllers is configured to send a control signal to divert power to the DC link resistor if the DC link voltage exceeds a maximum threshold.

10. The system of claim 1 wherein the energy storage converter comprises a two quadrant bidirectional chopper.

11. The system of claim 1 wherein the DC link comprises a split DC link, and where in the energy storage converter comprises two two-quadrant bidirectional choppers.

12. A control system for a renewable power generation system comprising a renewable power source for producing source power, a source side converter for converting the source power to converted DC power, a DC link for receiving the converted DC power, a grid side converter coupled to the DC link for converting DC link power from the DC link to AC output power for a grid, an electrical energy storage device having a state of charge (SOC), and an energy storage converter coupling the energy storage device to the DC link, wherein the control system comprises:
   a source side controller for driving the converted DC power towards a maximum power point;

a grid side controller for controlling the AC output power of the grid side converter to achieve grid interconnection requirements;

an energy storage controller for controlling the energy storage converter to achieve a desired power balance on the DC link; and a state of charge (SOC) manager for receiving a SOC signal from the energy storage device and, if the SOC signal is lower than an acceptable SOC operating range, for enabling charging of the energy storage device by providing a grid side low SOC adjustment signal to the grid side controller to reduce the AC output power and/or providing a source side low SOC adjustment signal to the source side controller to increase the source power, and, if the SOC signal is higher than the acceptable SOC operating range, for enabling discharging of the energy storage device by providing a grid side high SOC adjustment signal to the grid side controller to increase the AC output power, by diverting power from the DC link to a braking resistor, and/or by providing a source side low SOC adjustment signal to the source side controller to reduce the source power.

13. The control system of claim 12, wherein the source and grid side controllers each operate independently when the SOC of the energy storage device is within the acceptable SOC operating range.

14. The control system of claim 12 wherein the renewable power generation source comprises a wind turbine, wherein the source side controller is configured for receiving a torque feedback signal and a torque command signal for use controlling the source side converter, and wherein the grid side controller is configured for receiving grid feedback signals and a power command for use controlling the grid side converter.

* * * * *